Sept. 23, 1958 V. N. MACKIW ET AL 2,853,398
METHOD OF PRODUCING COMPOSITE NON-METALLIC
METAL POWDERS
Filed April 11, 1956
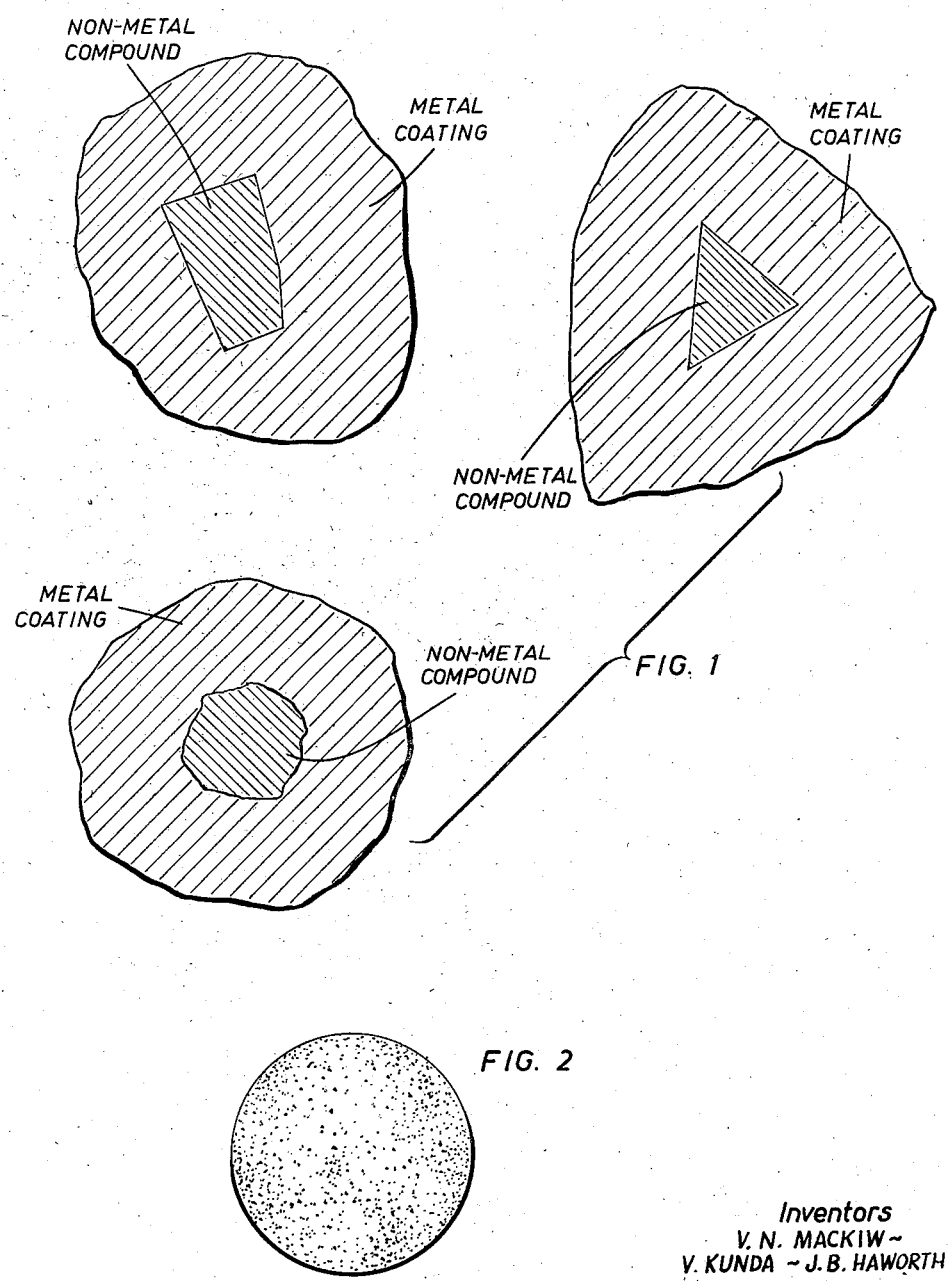
Inventors
V. N. MACKIW ~
V. KUNDA ~ J. B. HAWORTH

2,853,398
METHOD OF PRODUCING COMPOSITE NON-METALLIC METAL POWDERS

Vladimir Nicolaus Mackiw, Vasyl Kunda, and John Bryan Haworth, Fort Saskatchewan, Alberta, Canada, assignors to Sherritt Gordon Mines Limited, Toronto, Canada, a company of Canada Application April 11, 1956, Serial No. 577,444

6 Claims. (Cl. 117—47)

This invention relates to a method of producing composite non-metallic particles coated with metal. The method is particularly directed to the preparation of composite non-metallic-metal powders suitable for use as high temperature materials by the precipitation of one or more metals on exposed surfaces of non-metallic particles by gas reduction from a solution which contains a dispersion of pre-selected non-metallic particles and in which the metal of interest is present as a soluble compound.

High temperature alloys and cermets or ceremels are well known and are in relatively wide use. The demand for such high temperature materials is increasing rapidly, particularly for high speed machine parts exposed to high temperatures, for example, in jet engines.

A further important use of composite non-metallic-metal powders resides in the substitution of such composites, such as alumina and copper, for use as conductors, of electrical energy. It has been found that conductors, such as bus bars, transmission wires and the like formed for example of alumina and copper, are substantially stronger than copper and while the conductivity is less than that of copper, it is substantially higher than materials produced by conventional alloying methods.

Also, it has been found that a composite powder comprised of non-metallic particles, such as a metal oxide, for example, alumina, coated with a metal provides, after suitable treatment, materials which are more resistant to high temperatures than are mixtures of conventional metal powders. Thus, there is a definite trend towards the use of composite mixtures of non-metallics and metals as high temperature materials.

The preparation of satisfactory composite powders comprised of non-metallic particles coated with metal heretofore has presented serious difficulties which have restricted their production and use. It is necessary to prepare the constituents of the materials in the form of relatively small particles or powder. The surfaces of the resulting non-metallic particles are then provided with a film or coating of the metal of interest. The product of this coating step is compacted into its desired shape by conventional compacting methods such as by compressing, sintering and annealing.

Heretofore, metal coatings on non-metallic materials have been produced by spraying or sputtering metals of interest at a temperature above their melting temperature and/or by mechanical attrition. Production of metal coatings by spraying or sputtering is generally restricted to metals having relatively low melting temperatures and the size of the resulting particles varies over a wide range. Also, coating powders by spraying presents serious operating difficulties. Sputtering or vacuum metallization is another method of coating non-metallics but is expensive and also presents operating difficulties. Mechanical mixing is slow, costly, and involves the use of apparatus such as rod mills, rotary plates and ball mills and other types of mixers, some of which require special, costly grinding media and/or lining. In addition, such methods have the further disadvantage that the particles tend to become contaminated with particles of the grinding media or of the lining.

A further problem resides in coating or impregnating the surfaces of non-metallic particles by conventional methods of producing non-metallic-metal high temperature composite materials. Heretofore, the only method available has been by grinding a mixture of both constituents, such as in a ball mill or in a rod mill. This procedure suffers all the disadvantages of producing powders by mechanical attrition, that is, cost, time, contamination and non-uniform sizes. In addition, the product is not satisfactory, possibly because of the difficulty in applying a film or coating to an irregular surface and possibly because the non-metallic particles usually are of a substantially lower density than the metal with which they are to be coated and/or impregnated thus making it difficult, if not impossible, to obtain the homogeneous dispersion in the mill necessary for a substantially uniform product. Also, it has been found that non-metallic-metal alloys are most satisfactory when they are prepared from powders of the finest particle size. Thus, the powders which produce the best and most satisfactory alloys cannot be prepared by presently known methods, such as by mechanical attrition.

We have found that problems heretofore attendant with the production of non-metallic-metal composite materials can be overcome very easily and very inexpensively. In its simplest form, the method of the present invention involves the dispersion of particles of a non-metal, or of two or more non-metals or non-metal-metal combinations in an ammoniated solution which contains, in solution, a soluble salt of a metal which can be precipitated from the solution as a metal powder by reaction with a reducing gas at elevated temperature and pressure. The dispersion of non-metallic and precipitated metal particles is agitated sufficiently to hold the particles in suspension in the solution. The temperature of the mixture is maintained at that temperature at which optimum reduction is obtained and reducing gas is fed into the reaction vessel at a rate sufficient to establish and maintain the partial pressure of reducing gas at which reduction proceeds satisfactorily. The reducing reaction is continued until the dissolved metal salt content of the solution has been reduced to and precipitated as metal to the desired extent.

The resulting product, in the form of an intimate association of non-metallic particles and precipitated metal powder is separated from the solution, such as by filtration. It is washed and dried and is then in ideal condition for compacting according to conventional methods.

Non-metallic materials suitable for use in high melting temperature alloys are refractory oxides, refractory metal sulphides, carbon in any of its crystal forms, and particularly metal oxides such as alumina, beryllia, thoria, zirconia, titania, silica and mixtures of these oxides and oxide combinations thereof with calcium oxide, such as the Spinel group. Also, ceria, chromium oxide, uranium oxide and vanadium oxide. The refractory sulphides of cerium, thorium and uranium also are useful.

The present method contemplates the treatment of the non-metallic fraction of the composite powder in the form of particles of a desired size range. The method is independent of the source or origin of the non-metallic particles. In the absence of a chemical method of producing the non-metallic fraction in finely divided form, it must be prepared by conventional mechanical attrition.

Metal values which can be precipitated from an ammoniated solution by reaction with a reducing gas at elevated temperature and pressure are those of the group osmium, rhodium, ruthenium, iridium, gold, platinum, palladium, silver, copper, arsenic, tin, nickel, and cobalt. Usually, however, these precipitatable metals will be of the group silver, copper, nickel and cobalt. These metals can be precipitated very easily in metallic state from an ammoniated solution by reaction with a reducing gas at elevated temperature and pressure.

Under normal conditions of reduction, metal precipitated from the ammoniated solution is in the form of finely divided metal powders, of the order of 10 microns or less in size. This metal tends to deposit on and become intimately associated with the non-metallic particles.

It is a feature of this invention that the metal is precipitated as a film or coating on the non-metallic particles, thus preparing the product of the method, after separation from the solution, washing and drying, in condition for compacting without further processing. Thus, an important feature of this invention resides in the treatment given to the non-metallic particles prior to charging them into the reaction vessel in which the reducing reaction is conducted. This preliminary treatment assures that the metal deposits as a film or coating on the non-metallic particles.

For the precipitation of metals other than silver and copper, non-metallic particles are treated or impregnated with a catalytic or a nucleating agent which is adapted to initiate and accelerate the reducing reaction. That is, non-metallic particles treated or impregnated with a catalytic or nucleating agent provides exposed surfaces which with adsorbed reducing gas have a localized substantially higher reducing power than the body of the solution in which the particles are suspended. Thus, metal values dissolved in the solution in contact with those surfaces are reduced to and precipitate from the solution as metal powder more rapidly than do the metal values contained in the solution spaced from the non-metallic particles. The net result is that metal powder precipitates from the solution on to the surfaces of the non-metallic particles and forms a film or coating on those particles. A nucleating agent can be employed of course in the precipitation of silver and copper but it is not essential.

Agents which are suitable for use in treating non-metallic particles for the purpose of the present invention are, in general, compounds which have a higher reducing power, when dissolved in the solution, under reducing conditions than that of the reducing gas employed and thus possesses the property of promoting the molecular activity of hydrogen. That is, they are characterized by their ability to initiate and promote the reducing reaction at exposed surfaces of the non-metallic particles above the reducing power of the reducing gas alone. Suitable agents include, but are not limited to, certain polyvalent ions in their lowest state of oxidation such as ferrous, thorous, cerous, manganous, and chromous compounds; hydrophosphites, hydrosulphites, hydrazine, formaldehyde and hydrosulphides; phosphite, cyanide, formate, thiosulphate, nitrite, sulphite and sulphide compounds. Usually, an agent will be in the form of a soluble salt or a solid suspension of a salt with which the non-metallic particles can be impregnated prior to their dispersion in the ammoniated solution. Also, a salt usually will be selected and an amount employed which will have satisfactory activating properties with minimum contamination of the desired composite non-metallic-metal product.

The method is very simply conducted. The non-metallic particles are prepared by any conventional method to produce particles within a desired size range, for example, from about 200 to 1 micron in size or smaller, within which range they can be held in suspension, such as by mechanical agitation, in the solution subjected to reaction with the reducing gas.

The non-metallic particles are then impregnated, if necessary, with a catalytic or nucleating agent for the metal to be precipitated during the reducing reaction. This impregnation can be effected very easily by dispersing the non-metallic particles in a solution which contains a soluble salt or a dispersion of the selected catalyst or nucleating agent. The mixture or slurry is then actively agitated to effectively impregnate the non-metallic particles with the selected catalyst. The non-metallic particles are then separated from the solution such as by filtration and passed to the reduction step of the method.

Treated or untreated non-metallic particles are dispersed and held as a dispersion in an ammoniated solution which contains or to which is added a soluble compound of a metal to be precipitated during the reducing reaction. Factors which affect the reduction and precipitation of metal values from the solution are the nature and the characteristics of the metal values to be precipitated, the temperature and pressure at which the reducing reaction is conducted, and nature and the characteristics of the solution and the reducing gas employed. All these factors must be taken into consideration and the conditions of operation adjusted to produce optimum precipitation of desired metal values.

The solution is selected with regard to the solubility therein of the non-metallic particles and the metal values to be precipitated and the reactivity, if any, of the reducing gas employed. Thus, the solution can be organic or inorganic, acid, basic or neutral, having regard to all the factors entering into the reduction. Usually, the ammoniated solution to be treated will be aqueous in origin and nature. However, in selective precipitation of values of specific metals, other solvents such as alkanols, ethers, ketones, esters and the like may be employed. Any solvent which will dissolve in satisfactory concentrations, the metal salt, values of which are to be precipitated in the reducing reaction, and in which the non-metallic particles are relatively insoluble or only partly soluble under the reducing reaction, can be employed.

Ammonia usually is preferred as the complex forming amine. However, organic amines such as methyl amine or ethyl diamine can be substituted for all or part of the ammonia.

The reducing gas also is selected with regard to all factors entering into the reducing reaction. Usually, it is desired to precipitate the desired metal values substantially free from impurities. Thus, it usually is preferred to employ hydrogen gas as the reducing gas. However, other reducing gases such as carbon monoxide, methane, producer gas, natural gas, or mixtures of reducing gases can be employed, if desired.

The anion of the metal to be precipitated is selected with regard to the solubility of the metal compound in the selected solvent and the reactivity of the anion with the reducing gas. Usually, in basic solutions, sulphate, chloride, nitrate and carbonate anions and in acid solutions, fluosilicate or acetate anions may be employed. Strong, monobasic acid such as nitric and hydrochloric are not generally useful in commercial scale operation although they can be made operable in ammoniacal solutions.

The time required for the reducing reaction is a function of the temperature and pressure at which the reaction is conducted and varies inversely therewith. Preferably, the reaction is conducted at a temperature within the range of from about 200° F. to about 500° F. The reaction can be conducted at a temperature below about 200° F. but it tends to proceed too slowly for large scale commercial operation. Also, the reaction can be conducted at a temperature above about 500° F. but the increased rate of reduction does not warrant the increased cost of the high temperature-high pressure equipment required.

The reducing reaction is conducted under a partial pressure of reducing gas above about 50 pounds per square inch and preferably from about 100 to about 500 pounds per square inch to produce a total pressure of from about 140 to about 1000 pounds per square inch, preferably from about 250 to about 700 pounds per square inch. At partial pressures of reducing gas below about 50 pounds per square inch, the reaction proceeds too slowly and the increased rate of the reaction above about 500 pounds per square inch usually does not warrant the cost of the high pressure equipment involved. The term "total pressure" is intended to mean the pressure autogenously produced by the temperature at which the reducing reaction is conducted plus the partial pressure or the over pressure of the reducing gas employed.

The concentration of the metal salt in the solution is adjusted to that from which there is rapid precipitation of metal values from the solution but safely below that at which there would be any danger of crystallization in the reaction vessel or in pipe lines, valves and pumps. For example, in the precipitation of copper as powder metal from solutions by gas reduction, copper sulphate is quite soluble in aqueous acid or basic solution, up to about 100 grams per litre of copper at ambient temperature and to a greater extent at high temperatures. Therefore, concentrations of up to 75 to 100 grams of copper as sulphate per litre can be employed safely. Similarly, nickel and cobalt sulphates are relatively highly soluble in ammoniacal solutions and while it is preferred to employ solutions containing about 50 grams per litre, concentrations up to about 75 grams per litre of metal can be employed safely.

When precipitating metal powder from solution by gas reduction, the density of the resulting powder can be controlled by regulating the ammonia and/or the ammonium sulphate concentration of the solution. For example, copper metal can be precipitated from solutions of widely varying hydrogen ion contents. Accordingly, a solution may range from a strongly basic amine solution containing much free ammonia or other amines to one containing a relatively large amount of free acid. It is found that there should be an equivalent of from about 0.1 to 2.5 gram mols of ammonia present in the solution per gram atom of silver or copper or from about 1.5 to 4 gram mols ammonia per gram atom of nickel or cobalt or nickel plus cobalt in the precipitation of silver, copper, nickel and cobalt from solutions by gas reduction.

Metal values are precipitated from the solution to form a film or coating on exposed surfaces of non-metallic particles impregnated, if necessary, with a catalyst or a nucleating agent. This film or coating is formed on the non-metallic particles by forming a slurry comprised of the desired amount of non-metallic particles and an ammoniated solution containing, in solution, or having added thereto, the desired amount of metal as a soluble salt. This slurry is charged into the reaction vessel, such as an autoclave, and reacted with the reducing gas at elevated temperature and under superatmospheric pressure. The reducing reaction is continued until the desired amount of metal powder has been precipitated from the solution on to the surfaces of the non-metallic particles. At the end of the reduction period, non-metallic particles, coated with precipitated metal, are separated from the solution, such as by filtration. This composite powder, after washing and drying is in ideal condition for compacting by conventional means to form the desired high temperature alloys.

Resulting composite metal coated, non-metallic particles are illustrated in the accompanying drawing in which:

Figure 1 illustrates enlarged cross sections through typical composite metal coated, non-metallic particles; and Figure 2 is a top plan view of a compact formed of composite metal coated, non-metallic particles illustrated in Figure 1.

The composite particles were of a particle size of about 5 microns.

The following examples illustrate the operation of the method of the present invention to produce a composite powder suitable for use as a high temperature alloy.

*Example 1*

A high pressure autoclave was charged with 2,000 ml. of nickel ammonium sulphate solution which contained about 38.4 grams per litre nickel, about 2.26 gram mols free ammonia per gram atom of nickel and had dispersed therein about 76.7 grams per litre $Al_2O_3$ prepared by calcining aluminum ammonium sulphate salt. The autoclave was closed, the air was replaced with hydrogen gas and heated to about 350° F. At this temperature, hydrogen was fed into the autoclave to generate and maintain a partial pressure of hydrogen of about 250 pounds per square inch, total pressure about 500 pounds per square inch. In about 15 minutes, the nickel concentration of the solution dropped from about 34.8 grams per litre to about 1.2 grams per litre. The product was in the form of a mixture of $Al_2O_3$ and nickel powder which analyzed about 43.7% nickel and 56.3% $Al_2O_3$.

*Example 2*

Experiment 1 was repeated with the difference that the aluminum oxide particles were impregnated with a ferrous sulphate solution which contained about 20% ferrous sulphate, $FeSO_4 \cdot 7H_2O$, for about 15 minutes at room temperature. The particles impregnated with ferrous sulphate, were then separated from the ferrous sulphate solution, such as by filtration and charged with the nickel ammonium sulphate solution into the reaction vessel. The $Al_2O_3$ particles recovered from the reducing reaction were coated with nickel.

The following table illustrates additional results obtained in the preparation of composite powders suitable for use as high temperature alloys. In each instance, the reduction was conducted at a temperature above about 300° F., preferably about 350° F., and under a partial pressure of hydrogen of about 350 pounds per square inch. Ammonia was present in the solution in the ratio of about 2 gram mols of ammonia per gram atom of silver, copper, nickel or cobalt and ammonium sulphate was present in the solution in the ratio of about 1 mol per gram atom of metal to be precipitated.

| | Non Metallic Particles | Metal Precipitated | Time, Mins. | Nucleating Agent | Composition of Solution, g. p. l. | Composition Produced, Percent | Characteristics of Product |
|---|---|---|---|---|---|---|---|
| 1 | $Al_2O_3$ | Ni | 25 | None | Ni, 38.4 | $Al_2O_3$, 50<br>Ni, 50 | Mixture of finely divided $Al_2O_3$-Ni particles. |
| 2 | $Al_2O_3$ | Ni | 20 | $FeSO_4$ | Ni, 53.3 | Ni, 83<br>$Al_2O_3$, 17 | Finely divided $Al_2O_3$ particles coated with nickel. |
| 3 | $Al_2O_3$ | Ni | 195 | None | Ni, 55 | Ni, 87<br>$Al_2O_3$, 13 | Mixture of finely divided $Al_2O_3$-Ni particles. |
| 4 | $Al_2O_3$ | Ni | 190 | None | Ni, 55.2 | Ni, 94<br>$Al_2O_3$, 6 | Do. |
| 5 | $Al_2O_3$ | Ni | 20 | $FeSO_4$ | Ni, 53.1 | Ni, 94<br>$Al_2O_3$, 6 | Finely divided $Al_2O_3$ particles coated with nickel. |
| 6 | $Al_2O_3$ | Ni | 15 | $FeSO_4$ | Ni, 51.2 | Ni, 95<br>$Al_2O_3$, 5 | Do. |
| 7 | $Al_2O_3$ | Cu | 15 | None | Cu, 55 | Cu, 95<br>$Al_2O_3$, 5 | Finely divided $Al_2O_3$ particles coated with copper. |
| 8 | $Al_2O_3$ | Ag | 20 | None | Ag, 20 | Ag, 92<br>$Al_2O_3$, 8 | Finely divided $Al_2O_3$ particles coated with silver. |
| 9 | $Cr_2O_3$ | Ni | 15 | $FeSO_4$ | Ni, 46.6 | Ni, 90<br>$Cr_2O_3$, 10 | Finely divided $Cr_2O_3$ particles coated with nickel. |
| 10 | $V_2O_5$ | Co | 60 | KCN<br>$Na_2S$ | Co, 30 | Co, 75<br>$V_2O_5$, 25 | Finely divided $V_2O_5$ particles coated with Co. |

The present method of producing composite non-metallic-metal powders suitable for use as high temperature alloys possesses a number of important advantages. Usually, the non-metallic particles can be prepared by conventional methods without difficulty to produce particles within a predetermined size range. The problems heretofore attendant with the preparation of metal powders within a predetermined size range by mechanical attrition are overcome. Also, problems heretofore attendant with coating the non-metallic particles with a film of metal are overcome. Further, the operation of the reducing reaction can be closely controlled to precipitate on the non-metallic particles a film or coating of metal of desired thickness and of desired density. This very desirable feature heretofore was unattainable by conventional methods.

What we claim as new and desire to protect by Letters Patent of the United States is:

1. The method of producing composite metal coated, non-metallic particles which comprises dispersing solid, refractory, non-metallic particles in an ammoniated solution in which said particles are insoluble and which contains, in solution, a soluble compound of a metal selected from the group consisting of osmium, rhodium, ruthenium, iridium, gold, platinum, palladium, silver, copper, arsenic, tin, nickel and cobalt, reacting the solution with a reducing gas at a temperature above about 200° F. and under a positive partial pressure of reducing gas to precipitate from said solution particles of metal in elemental form on said refractory, non-metallic particles, and continuing the reaction to coat said refractory, non-metallic particles with said precipitated metal, said solid refractory non-metallic particles being present in said solution in amount sufficient to form, with said precipitated metal powder, composite metal coated, non-metallic particles adapted to be compacted.

2. The method of producing composite metal coated, non-metallic particles according to claim 1 in which exposed surfaces of the non-metallic particles are treated, prior to their dispersion in the ammoniated solution, with a catalyst which has a higher reducing potential under reducing conditions than the reducing gas employed in the reducing reaction, whereby precipitated metal powder deposits on and adheres to surfaces of the non-metallic particles as they are precipitated from the solution.

3. The method of producing composite metal coated, non-metallic particles which comprises dispersing solid particles of a non-metallic compound selected from the group consisting of refractory oxides, refractory sulphides and mixtures thereof in an ammoniated solution in which said particles are insoluble and which contains a dissolved compound of a metal selected from the group consisting of osmium, rhodium, ruthenium, iridium, gold, platinum, palladium, silver, copper, arsenic, tin, nickel and cobalt, reacting the solution with a reducing gas to precipitate from said solution particles of metal in elemental form on said refractory, non-metallic particles, and continuing the reaction to coat said refractory, non-metallic particles with said precipitated metal, said solid refractory non-metallic particles being present in said solution in amount sufficient to form, with said precipitated metal powder, composite metal coated, non-metallic particles adapted to be compacted.

4. The method of producing composite metal coated, non-metallic particles according to claim 2 in which exposed surfaces of the non-metallic particles are treated, prior to their dispersion in the ammoniated solution, with a catalyst which has a higher reducing potential under reducing conditions than the reducing gas employed in the reducing reaction, whereby precipitated metal powder deposits on and adheres to surfaces of the non-metallic particles as they are precipitated from the solution.

5. The method of producing composite metal coated, non-metallic particles which comprises dispersing particles of a non-metallic compound selected from the group consisting of refractory oxides, refractory sulphides and mixtures thereof in an ammoniated solution in which said particles are insoluble and which contains free ammonia and a soluble sulphate of a metal selected from the group consisting of osmium, rhodium, ruthenium, iridium, gold, platinum, palladium, silver, copper, arsenic, tin, nickel and cobalt, reacting the solution with a reducing gas at a temperature above about 200° F. and under a positive partial pressure of reducing gas to precipitate from said solution particles of metal in elemental form on said refractory, non-metallic particles, and continuing the reaction to coat said refractory, non-metallic particles with said precipitated metal, said solid refractory non-metallic particles being present in said solution in amount sufficient to form, with said precipitated metal powder, composite metal coated, non-metallic particles adapted to be compacted.

6. The method of producing composite metal coated, non-metallic particles according to claim 5 in which exposed surfaces of the non-metallic particles are treated, prior to their dispersion in the ammoniated solution, with a catalyst which has a higher reducing potential under reducing conditions than the reducing gas employed in the reducing reaction, whereby precipitated metal powder deposits on and adheres to surfaces of the non-metallic particles as they are precipitated from the solution.

References Cited in the file of this patent

UNITED STATES PATENTS

| | | |
|---|---|---|
| 521,992 | Sachs et al. | June 26, 1894 |
| 2,694,005 | Schaufelberger | Nov. 9, 1954 |
| 2,694,006 | Schaufelberger et al. | Nov. 9, 1954 |
| 2,734,821 | Schaufelberger | Feb. 14, 1956 |
| 2,767,081 | Mackiw et al. | Oct. 16, 1956 |
| 2,790,736 | McLaughlin et al. | Apr. 30, 1957 |

FOREIGN PATENTS

| | | |
|---|---|---|
| 740,797 | Great Britain | Nov. 16, 1955 |